US010906192B1

(12) United States Patent
Eom et al.

(10) Patent No.: US 10,906,192 B1
(45) Date of Patent: Feb. 2, 2021

(54) GRIPPER

(71) Applicants: Robostar Co., Ltd., Gyeonggi-do (KR); FASTECH CO., LTD, Gyeonggi-do (KR)

(72) Inventors: Jae Won Eom, Seoul (KR); Yong Heum Na, Gyeonggi-do (KR); Jae Woo Lee, Seoul (KR); Young Cheol Kim, Gyeonggi-do (KR)

(73) Assignees: ROBOSTAR CO., LTD; FASTECH CO., LTD

( * ) Notice: Subject to any disclaimer, the term of this patent is extended or adjusted under 35 U.S.C. 154(b) by 0 days.

(21) Appl. No.: 16/570,119

(22) Filed: Sep. 13, 2019

(30) Foreign Application Priority Data

Jul. 12, 2019 (KR) .................. 10-2019-0084192

(51) Int. Cl.
*B25J 15/02* (2006.01)
*B25J 15/10* (2006.01)
*B25J 15/08* (2006.01)

(52) U.S. Cl.
CPC ......... *B25J 15/0273* (2013.01); *B25J 15/086* (2013.01); *B25J 15/103* (2013.01)

(58) Field of Classification Search
CPC .............. B25J 15/0033; B25J 15/0042; B25J 15/0047; B25J 15/0273; B25J 15/028; B25J 15/086; B25J 15/103; B25J 15/106; Y10S 294/902; Y10S 901/39
USPC ................................ 294/94, 96, 207, 119.1
See application file for complete search history.

(56) References Cited

U.S. PATENT DOCUMENTS

| | | | | |
|---|---|---|---|---|
| 6,089,577 A * | 7/2000 | Takada | ............. | B23B 31/16254 279/121 |
| 6,827,381 B1 * | 12/2004 | Reichert | ............... | B25J 15/028 294/119.1 |
| 8,152,214 B2 * | 4/2012 | Williams | ............. | F16C 29/126 294/119.1 |
| 8,267,451 B2 * | 9/2012 | Pedrazzini | ............ | B25J 13/088 294/119.1 |
| 10,112,666 B2 * | 10/2018 | Shi | ...................... | B25J 15/0047 |

(Continued)

FOREIGN PATENT DOCUMENTS

| JP | 2012-040658 | 3/2012 |
|---|---|---|
| KR | 10-2007-0122340 | 12/2007 |

OTHER PUBLICATIONS

Office Action issued in Korean Application No. 10-2019-0084192 dated Jul. 23, 2020.

*Primary Examiner* — Dean J Kramer
(74) *Attorney, Agent, or Firm* — The Belles Group, P.C.

(57) ABSTRACT

A gripper may be provided that includes a motor, a jaw guide, a wedge head, a jaw, and a finger. The jaw guide is disposed on the motor and has a guide hole and a plurality of guide grooves. The wedge head is disposed in the guide hole and is able to perform up and down reciprocating movement by the motor. The jaw is disposed in the plurality of guide grooves respectively and is connected to the wedge head. When the wedge head moves in an up and down direction, the jaw is able to perform a reciprocating movement in a direction perpendicular to the up and down direction. The finger is disposed on the jaw. When the jaw moves in the direction perpendicular to the up and down direction, the finger moves together with the jaw, so that the movement of an object is limited.

4 Claims, 14 Drawing Sheets

(56) References Cited

U.S. PATENT DOCUMENTS

2015/0336277 A1* 11/2015 Schanz ................ B25J 15/0028
                                                                     294/97
2017/0057099 A1* 3/2017 Schweigert .......... B25J 15/0047
2018/0290267 A1* 10/2018 Kirsten ............. B23B 31/16254

* cited by examiner (a)

(b)

(c)

(a)

(b)

(a)

(b)

(a)  (b)

(a)

(b)

(a)　　　　　　　　　(b)

(a)　　　　　　　　　(b)

(a)  (b)

(a)  (b)

GRIPPER

CROSS-REFERENCE TO RELATED PATENT APPLICATIONS

The present application claims priority to Korean Patent Application No. 10-2019-0084192, filed Jul. 12, 2019. The disclosure of the aforementioned priority application is incorporated herein by reference in its entirety.

BACKGROUND

Field

The present disclosure relates to a gripper, and more particularly to a gripper capable of fixing an object that needs to be fixed during a working process of a production facility by using a finger.

Description of the Related Art

There are a variety of devices for fixing an object that needs to be fixed during a working process of a production facility (e.g., a vehicle body and a vehicle panel which need to be fixed during the assembly process of a vehicle production facility).

In general, a kind of a fixing pin (not shown) is being used in the production facility, which is coupled to one end of a kind of a fixing device (not shown) and fixes the object by gripping the fixed portion of the object.

In the production facility, when the object has a plurality of fixed portions, the shapes of the fixed portions may be different from each other, and when there are a plurality of objects that need to be fixed, the shapes of the fixed portions may be different from each other. When fixing the object by using the fixing pin, the fixing pin needs to be replaced in each case mentioned above. A lot of fixing pins are required to be provided in advance in preparation for the number of cases.

Therefore, when the object has a plurality of fixed portions and there are a plurality of objects that need to be fixed, it is necessary to grip and fix the object by using one component.

A gripper which grips and fixes an object is being much used in industrial fields using automation facilities, etc.

It is common to grip and release components by moving a jaw (by tightening or opening a jaw) of the gripper. Therefore, this enables the object to be fixed.

SUMMARY

One embodiment is a gripper which includes a motor, a jaw guide, a wedge head, a jaw, and a finger. The jaw guide is disposed on the motor and has a guide hole and a plurality of guide grooves. The wedge head is disposed in the guide hole and is able to perform up and down reciprocating movement by the motor. The jaw is disposed in the plurality of guide grooves respectively and is connected to the wedge head. When the wedge head moves in an up and down direction, the jaw is able to perform a reciprocating movement in a direction perpendicular to the up and down direction. The finger is disposed on the jaw. When the jaw moves in the direction perpendicular to the up and down direction, the finger moves together with the jaw, so that the movement of an object is limited.

The finger includes: a body; a fastening portion which is disposed under the body; and an extension portion which is disposed under the fastening portion, of which one end is connected to the fastening portion, and of which the other end is coupled to the jaw. After the body is inserted into a fixed portion of the object, when a rotary shaft of the motor rotates in one direction, the wedge head moves upward and the finger disposed on the jaw moves outward from a longitudinal center of the gripper, and then an outer circumferential surface of the fastening portion comes in contact with an inner circumferential surface forming the fixed portion of the object, so that the movement of an object is limited.

The body becomes thicker from one end thereof to the other end thereof in a longitudinal direction of the body.

A level difference is formed between one end and the other end of the body in a longitudinal direction of the body. The body becomes thicker from the one end to the level difference of the body. The thickness from the level difference to the other end of the body is uniform.

The fastening portion is formed concave along a circumference of the outer circumferential surface of the fastening portion in a direction perpendicular to the longitudinal direction of the body. An inner circumferential surface forming the fixed portion of the object is disposed within the concave-shaped fastening portion.

Another embodiment is a gripper which includes: a motor; a jaw guide which is disposed on the motor and has a guide hole and a plurality of guide grooves; a wedge head which is disposed in the guide hole and is able to perform up and down reciprocating movement by the motor; a jaw which is disposed in the plurality of guide grooves respectively and is connected to the wedge head, wherein, when the wedge head moves in an up and down direction, the jaw is able to perform a reciprocating movement in a direction perpendicular to the up and down direction; and a finger which is disposed on the jaw. The finger includes: a body; a fastening portion which is disposed under the body; and an extension portion which is disposed under the fastening portion, of which one end is connected to the fastening portion, and of which the other end is coupled to the jaw. When the jaw moves in the direction perpendicular to the up and down direction, the finger moves together with the jaw, so that the movement of an object is limited.

One side of the body becomes thicker from one end to the other end of the body in a longitudinal direction of the body. The other side of the body is formed concave from one end to the other end of the body in the longitudinal direction of the body. When a rotary shaft of the motor rotates in the opposite direction to one direction, the wedge head moves downward and the finger disposed on the jaw moves from an outside of the gripper toward a longitudinal center of the gripper, and then the other side of the body contacts the object, so that the movement of the object is limited.

In one side of the body, a level difference is formed between one end and the other end of the body in a longitudinal direction of the body. A thickness from the one end to the level difference of the body increases. A thickness from the level difference to the other end of the body is uniform. The other side of the body is formed concave from one end to the other end of the body in the longitudinal direction of the body. When a rotary shaft of the motor rotates in the opposite direction to one direction, the wedge head moves downward and the finger disposed on the jaw moves from an outside of the gripper toward a longitudinal center of the gripper, and then the other side of the body contacts the object, so that the movement of the object is limited.

One side of the fastening portion is formed concave along a circumference of an outer circumferential surface of the fastening portion in a direction perpendicular to the longitudinal direction of the body. The other side of the fastening portion is the same as the other side of the body. The other side of the body and the other side of the fastening portion contact the object, so that the movement of the object is limited.

DETAILED DESCRIPTION

Embodiments of the present invention will be described in detail with reference to the accompanying drawings. In the components of the present invention, detailed descriptions of what can be clearly understood and easily carried into practice through prior art by those skilled in the art will be omitted to avoid making the subject matter of the present invention unclear.

Hereinafter, a gripper according to an embodiment of the present invention will be described.

Figure 1:
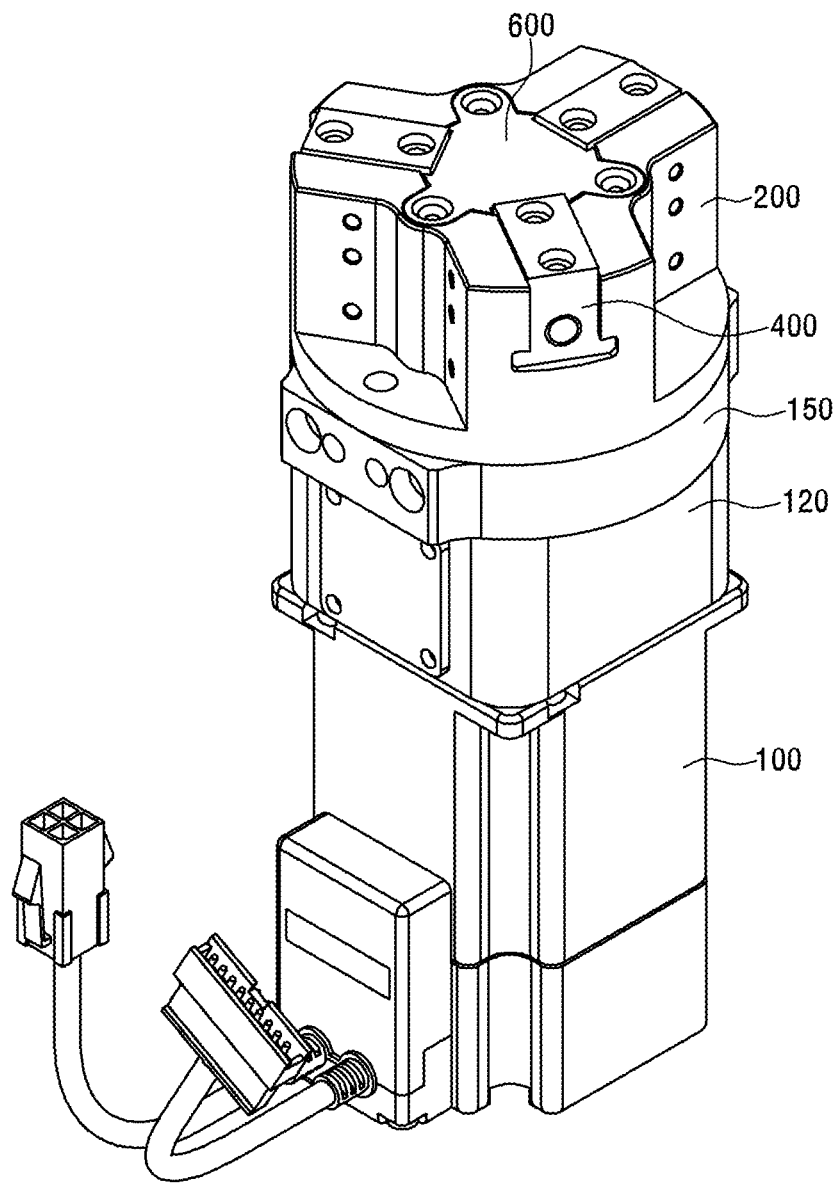
FIG. 1 is a perspective view showing a gripper according to an embodiment of the present invention before a finger is placed.
Figure 2:
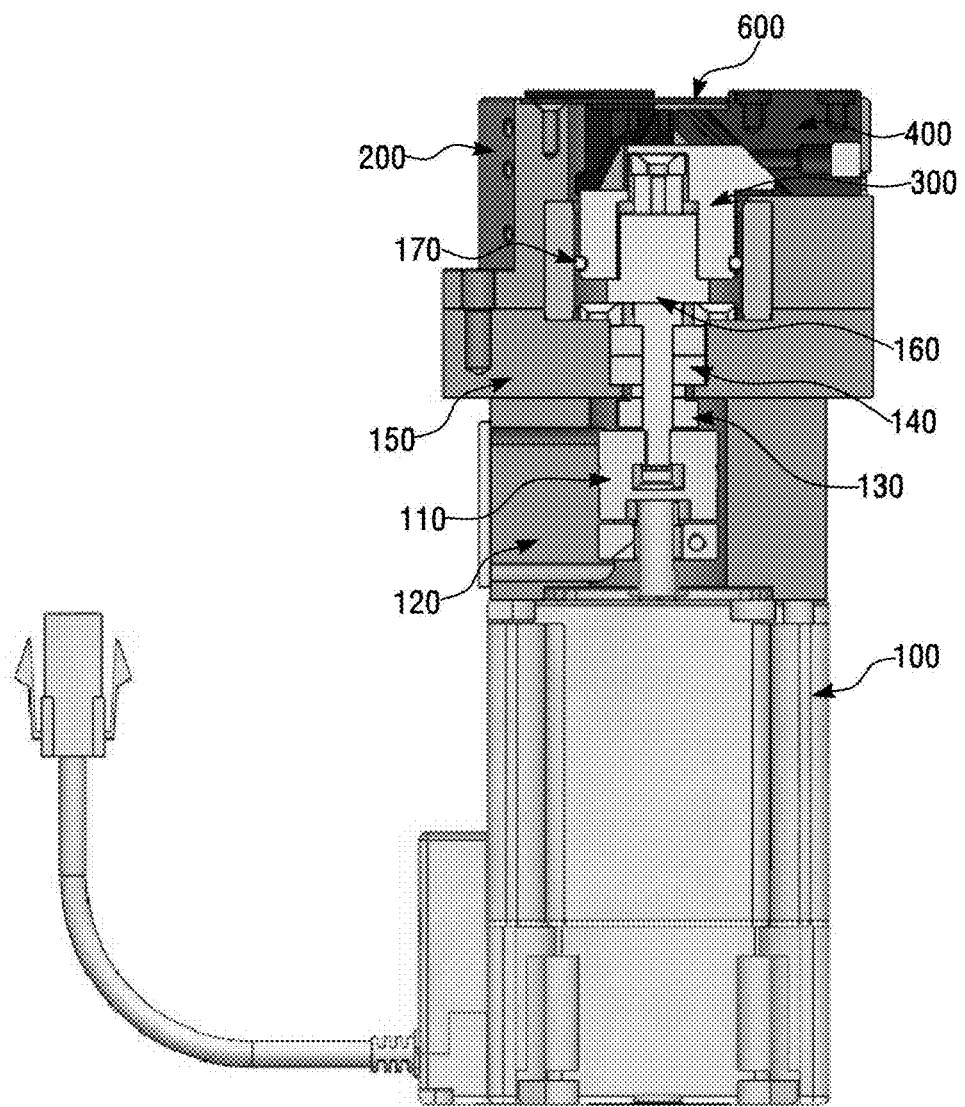
FIG. 2 is a cross sectional view of the gripper shown in FIG. 1.

FIG. 1 is a perspective view showing the gripper according to the embodiment of the present invention before a finger is placed. FIG. 2 is a cross sectional view of the gripper shown in FIG. 1.

Referring to FIGS. 1 and 2, the gripper according to the embodiment of the present invention includes a motor 100, a jaw guide 200, a wedge head 300, and a jaw 400. Also, the gripper according to the embodiment of the present invention may further include a coupling 110, a coupling housing 120, a locknut 130, an angular bearing 140, a bearing housing 150, a ball screw 160, and a bush 170. In the following description, the respective components will be described.

The coupling 110, the coupling housing 120, the locknut 130, the angular bearing 140, the bearing housing 150, the ball screw 160, and the bush 170, which constitute the gripper according to the embodiment of the present invention, are commonly used components or include components which perform the same function as their functions and have different names.

The motor 100 constituting the gripper according to the embodiment of the present invention constitutes one end of the gripper.

The motor 100 may be a kind of a Servo motor. A two-phase AC Servo motor or a DC servo motor which is commonly used may be used as the Servo motor.

The coupling 110 may be disposed on one side of the motor 100. Electrical equipment including electric wires supplying electricity to the motor 100 and an electric board with circuits, etc., may be disposed on the other side of the motor 100.

The coupling 110 that is disposed on one side of the motor 100 may be disposed within the coupling housing 120.

The coupling housing 120 may have a predetermined space capable of receiving the coupling 110.

The coupling housing 120 may be disposed on one side of the motor 100. The coupling 110 may be disposed in the predetermined space formed in the coupling housing 120.

The motor 100 and the coupling housing 120 are coupled and fixed to each other by means of a fastening means such as a coupling screw, etc., and then forms the body of the gripper according to the embodiment of the present invention.

The coupling 110 refers to a component which is used to connect a shaft and a shaft, commonly used.

The coupling 110 may be connected to the motor 100 and the ball screw 160. Specifically, one side of the coupling 110 may be connected with the rotary shaft of the motor 100, and the other side of the coupling 110 may be connected with the rotary shaft of the ball screw 160.

The locknut 130 may be disposed on the coupling 110.

The locknut 130 may be disposed in the predetermined space of the coupling housing 120 and/or the bearing housing 150 when the coupling housing 120 and the bearing housing 150 are coupled to each other.

The locknut 130 is connected to the ball screw 160, thereby serving to hold the ball screw 160.

The coupling housing 120 may be connected to the bearing housing 150 which is disposed on the coupling housing 120.

The bearing housing 150 and the coupling housing 120 are coupled and fixed to each other by means of a fastening means such as a coupling screw, etc., and then forms the body of the gripper according to the embodiment of the present invention.

The bearing housing 150 may have a predetermined space capable of receiving the angular bearing 140.

The angular bearing 140 refers to a commonly used angular bearing 140 composed of an inner ring, an outer ring, and a ball disposed between the inner ring and the outer ring.

The angular bearing 140 may be disposed and fixed in the predetermined space formed in the bearing housing 150. Specifically, the outer ring of the angular bearing 140 contacts and is fixed to the inner surface of the bearing housing 150.

Since the rotary shaft of the ball screw 160 is arranged to pass through the inner ring of the angular bearing 140, the inner ring of the angular bearing 140 can serve to hold the rotary shaft of the ball screw 160.

The ball screw 160 refers to a component which is used to converts a rotary motion into a linear motion, commonly used.

The ball screw 160 is composed of a screw shaft, a steel ball and a nut surrounding the screw shaft. The screw ball is disposed between the screw shaft and the nut. The screw shaft of the ball screw 160 serves as a rotary shaft.

The screw shaft of the ball screw 160 performs a rotational motion, and the nut connected to the screw shaft performs a linear motion.

The ball screw 160 may be disposed in a predetermined space formed within the jaw guide 200 and the inner ring of the angular bearing 140. Specifically, the screw shaft, i.e., the rotary shaft of the ball screw 160 is arranged to pass through the inner ring of the angular bearing 140, and the nut of the ball screw 160 is disposed in the predetermined space formed within the jaw guide 200.

The wedge head 300 may be disposed and fixed in the nut of the ball screw 160.

One end of the screw shaft, i.e., the rotary shaft of the ball screw 160 may be connected to the coupling 110. Specifically, the screw shaft, i.e., the rotary shaft of the ball screw 160 may be connected to the other side of the coupling 110. The rotary shaft of the motor 100 is connected to one side of the coupling 110. Therefore, when the rotary shaft of the motor 100 rotates by the operation of the motor 100, the screw shaft, i.e., the rotary shaft of the ball screw 160 may be rotated through the medium of the coupling 110. By the rotation of the screw shaft of the ball screw 160, the nut of the ball screw 160 is able to perform a linear motion. Therefore, the wedge head 300 disposed and fixed in the nut of the ball screw 160 is also able to perform a linear motion.

The linear motion of the nut of the ball screw 160 and the linear motion of the wedge head 300 means a linear reciprocating motion. Specifically, for example, when the rotary shaft of the motor 100 rotates clockwise, the nut of the ball screw 160 and the wedge head 300 may perform a linear motion in an upward direction (or in a downward direction). Also, when the rotary shaft of the motor 100 rotates counterclockwise, the nut of the ball screw 160 and the wedge head 300 may perform a linear motion in a downward direction (or in an upward direction).

The bearing housing 150 may be connected to the jaw guide 200 that is disposed on the bearing housing 150.

The jaw guide 200 and the bearing housing 150 are coupled and fixed to each other by means of a fastening means such as a coupling screw, etc., and then forms the body of the gripper according to the embodiment of the present invention.

Figure 3:
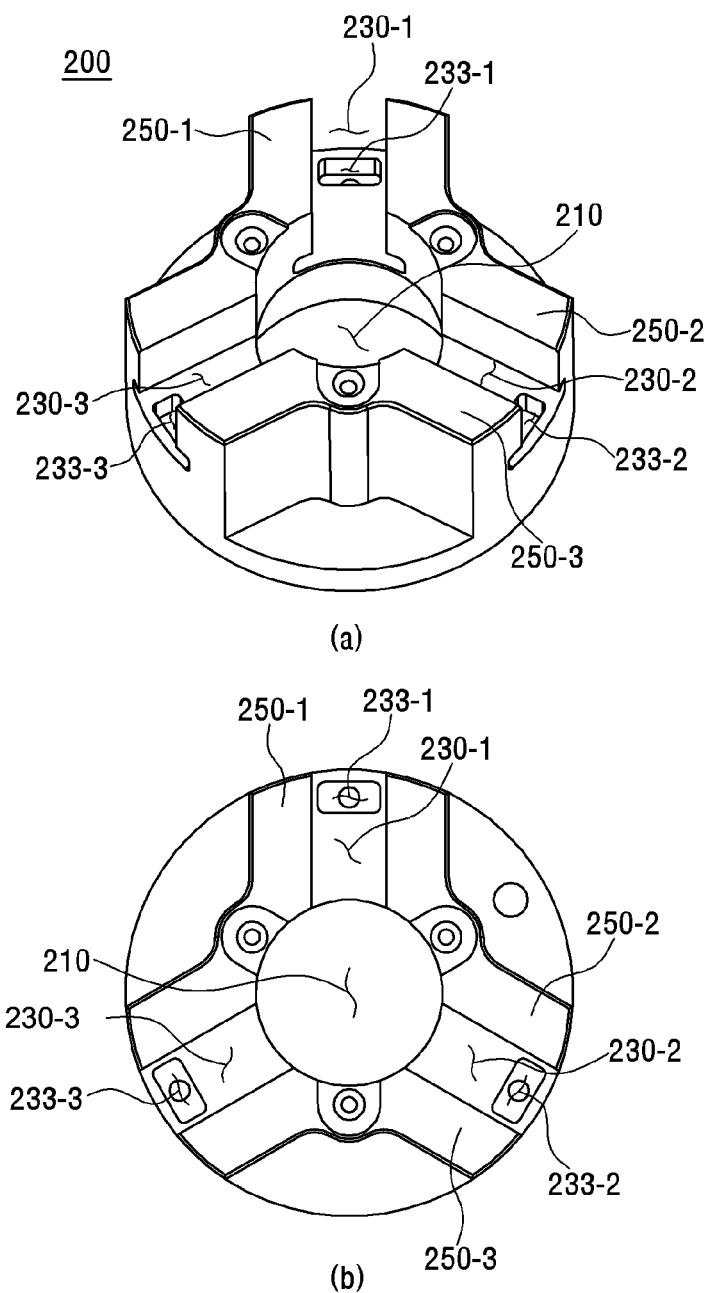
FIG. 3 is a view showing a jaw guide shown in FIG. 2.

FIG. 3 is a view showing the jaw guide shown in FIG. 2. A perspective view of the jaw guide is shown in (a) of FIG. 3, and a plan view of the jaw guide is shown in (b) of FIG. 3.

Referring to FIGS. 1 and 3, the jaw guide 200 may be disposed on the motor 100 and may have a guide hole 210 and a plurality of guide grooves 230.

The jaw guide 200 may have a predetermined space for receiving a portion of the screw shaft of the ball screw 160, the nut of the ball screw 160, and the wedge head 300 disposed and fixed in the nut of the ball screw 160. Here, the predetermined space may be the guide hole 210. The guide hole 210 may be formed in the central portion of the jaw guide 200 and penetrate in the up and down direction.

The shape of the guide hole 210 as viewed from above may be circular, however, without being limited to this, may be various, such as a polygonal shape. The shape of the guide hole 210 as viewed from above may be in correspondence with the shape of a body 330 of the wedge head 300 which perform a linear motion in up and down direction in the guide hole 210.

The jaw guide 200 may have the plurality of guide grooves 230. Two or more guide grooves 230 may be provided. The jaw 400 may be disposed in the guide groove 230.

The guide groove 230 may have a bottom surface. The guide groove 230 may be formed with two sidewalls 250 protruding or extending upward from the bottom surface. The two sidewalls 250 are disposed apart from each other by a predetermined distance. In other words, the guide groove 230 may be formed between the sidewall 250 and the sidewall 250 and may be an empty space with the bottom surface.

The guide groove 230 may be connected to the guide hole 210.

The embodiment shown in FIG. 3 shows three guide grooves 230 230-1, 230-2, 230-3 of the guide groove 230. Each of the guide grooves 230 is connected to the guide hole 210. Specifically, a first sidewall 250-1 forms the first guide groove 230-1, the guide hole 210, and the third guide groove 230-3. A second sidewall 250-2 forms the first guide groove 230-1, the guide hole 210, and the second guide groove 230-2. A third sidewall 250-3 forms the second guide groove 230-2, the guide hole 210, and the third guide groove 230-3.

The wedge head 300 may be disposed and move in the guide hole 210 of the jaw guide 200.

Figure 4:
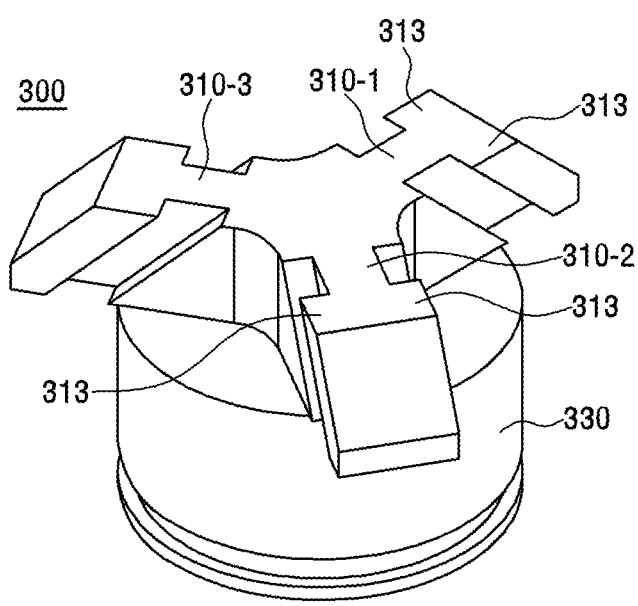
FIG. 4 is a view showing a wedge head shown in FIG. 2.

FIG. 4 is a view showing the wedge head shown in FIG. 2.

Referring to FIGS. 1 and 4, the wedge head 300 is able to perform up and down reciprocating movement by the motor 100.

The wedge head 300 may be disposed (connected) and fixed in the nut of the ball screw 160 and may perform a linear reciprocating motion. The linear reciprocating motion of the wedge head 300 is performed in the up or down direction in the guide hole 210 of the jaw guide 200.

The bush 170 may be disposed on the outer surface of the wedge head 300. Specifically, the bush 170 may be disposed between the outer surface of the wedge head 300 and the guide hole 210 of the jaw guide 200. The bush 170 is able to allow the wedge head 300 to easily perform a linear reciprocating motion in the up and down direction in the guide hole 210. According to the embodiment, the bush 170 may be a bush without oil, that is to say, an oilless bush.

The wedge head 300 may have a plurality of wings 310 and the body 330. The wing 310 and the body 330 may be formed integrally with each other or may be separately formed and coupled to each other.

The plurality of wings 310 may be formed in the upper part of the wedge head 300. The plurality of wings 310 may have the same number as that of the jaws 400.

One side of the wing 310 may have a vertical plate shape having a predetermined thickness. The end of the one side has a diagonal shape such that the lower portion of the end of the one side protrudes more in the longitudinal direction of the wing 310 than the upper portion of the end of the one side. A first catching protrusion 313 formed to protrude outward in both directions perpendicular to the longitudinal direction of the wing 310 may be formed on the end of the one side. The catching protrusion may be fitted in a sliding manner in a catching groove 410 formed in one side of the jaw 400.

The jaw 400 may be disposed in the guide groove 230 of the jaw guide 200.

Figure 5:
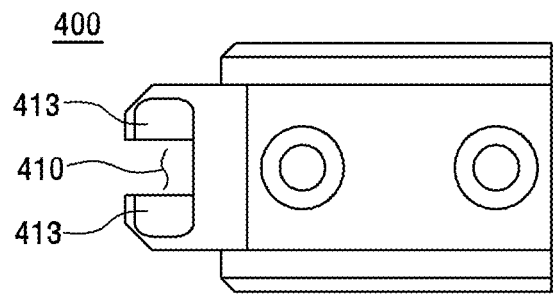
FIG. 5 is a view showing a jaw shown in FIG. 2.
Figure 5:
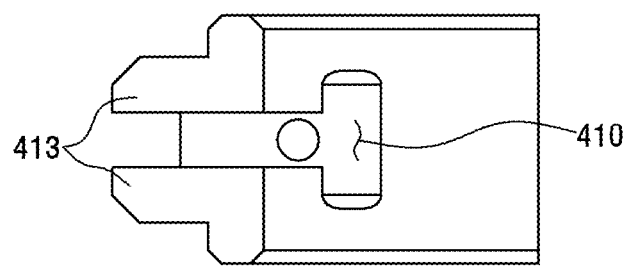
Figure 5:
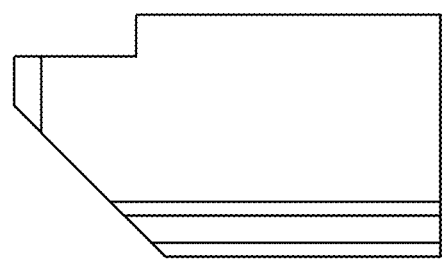

FIG. 5 is a view showing the jaw shown in FIG. 2. A plan view of the jaw is shown in (a) of FIG. 5. A bottom view of the jaw is shown in (b) of FIG. 5. A side view of the jaw is shown in (c) of FIG. 5.

Referring to FIG. 5, the jaw 400 is formed to have a polygonal body. The catching groove 410 may be formed in one side of the jaw 400. A second catching protrusion 413 formed to protrude inward in both directions perpendicular to the longitudinal direction of the jaw 400 may be formed on the outer end of the catching groove 410.

When the jaw 400 is viewed in a direction perpendicular to the side of the jaw 400 in which the catching groove 410 has been formed, specifically, is viewed from right or left, the corresponding portion of the jaw 400 (the end of the side of the jaw 400) has a diagonal shape such that the upper portion of the end of the side of the jaw 400 protrudes more in the longitudinal direction of the jaw 400 than the lower portion of the end of the side of the jaw 400.

Figure 6:
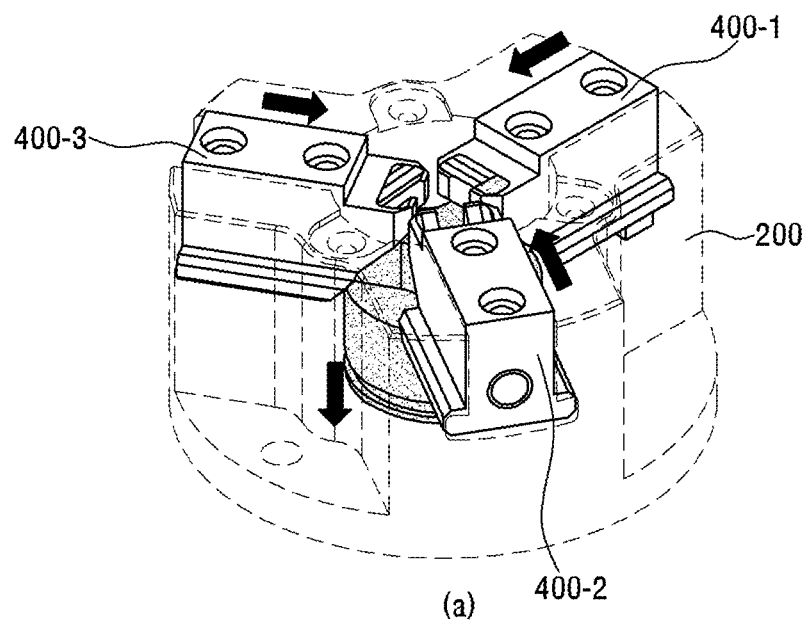
FIGS. 6 and 7 show the movement of the wedge head and the jaw shown in FIG. 2.
Figure 6:
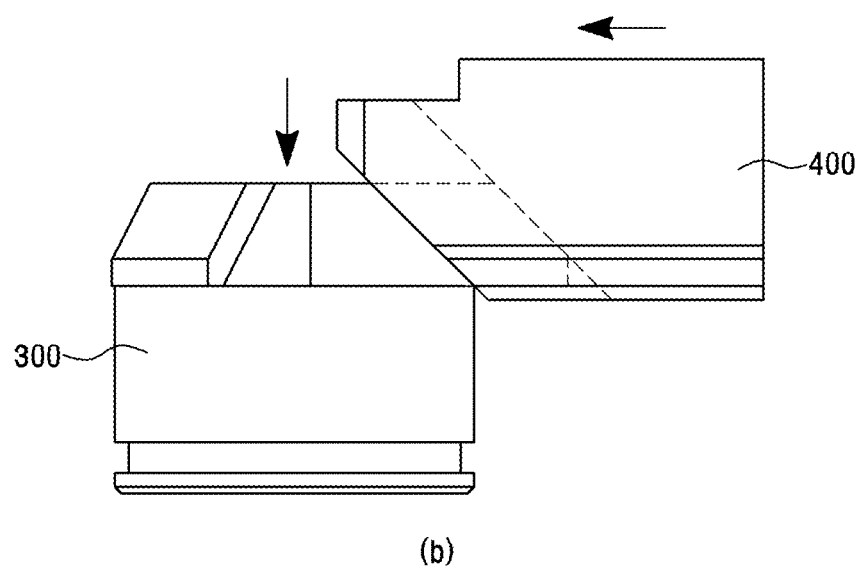
Figure 7:
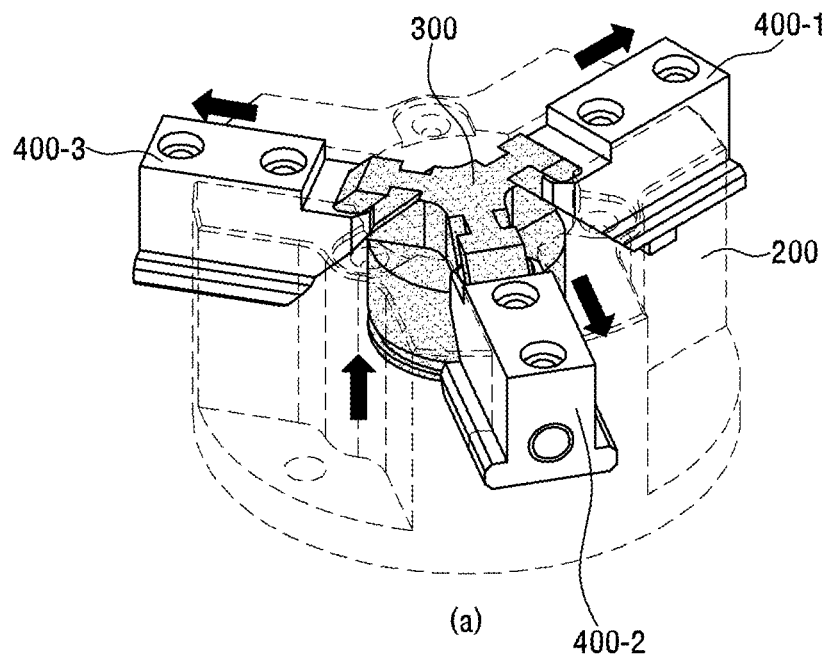
Figure 7:
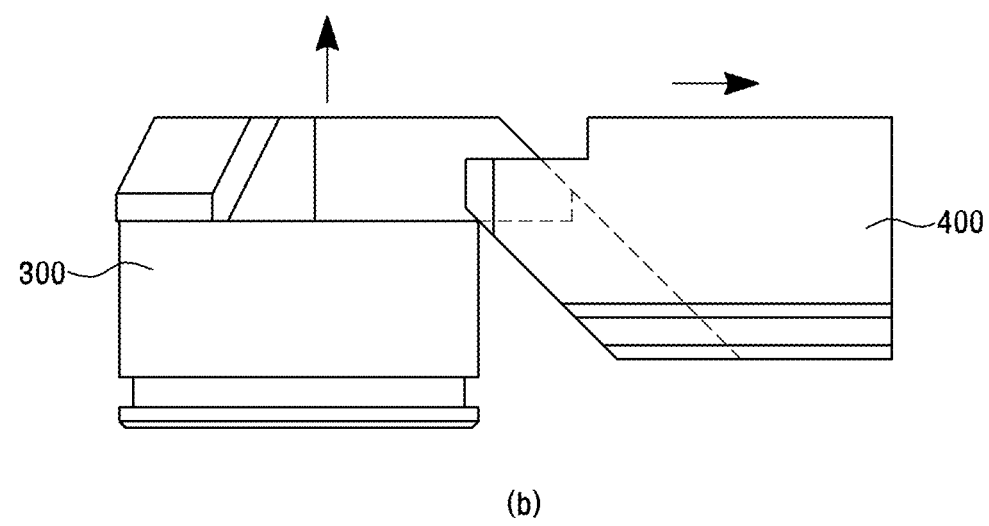

FIGS. 6 and 7 show the movement of the wedge head and the jaw shown in FIG. 2. A perspective view is shown in (a) of FIGS. 6 and 7. The movement of the wedge head and the jaw is schematically shown in (b) of FIGS. 6 and 7.

Referring to FIGS. 6 and 7, the wedge head 300 and the jaw 400 may be connected and perform a relative motion. Specifically, when the wedge head 300 moves in the up and down direction, the jaw 400 connected to the wedge head 300 may perform a reciprocating movement in a direction perpendicular to the up and down direction.

The first catching protrusion 313 formed on the wing 310 of the wedge head 300 may be fitted in a sliding manner in the catching groove 410 formed in one side of the jaw 400 and move in the up and down direction. Specifically, the first catching protrusion 313 of the wedge head 300 is fitted in a sliding manner in the catching groove 410 of the jaw 400, and then the first catching protrusion 313 of the wedge head 300 is not separated in the right and left direction by the second catching protrusion 413 of the jaw 400. Therefore, the jaw 400 is not separated from the wedge head 300 in the right and left direction.

The movement of the wedge head 300 and the jaw 400 will be described in detail as follows.

When the rotary shaft of the motor 100 rotates in one direction, the nut of the ball screw 160 and the wedge head 300 may perform an upward linear motion. Specifically, the first catching protrusion 313 formed on the wing 310 of the wedge head 300 may be fitted in a sliding manner in the catching groove 410 of the jaw 400 and perform an upward linear motion. Here, the end of the side of the jaw 400, where the catching groove 410 of the jaw 400 has been formed, has a diagonal shape such that the upper portion of the end of the side of the jaw 400 protrudes more in the longitudinal direction of the jaw 400 than the lower portion of the end of the side of the jaw 400. Therefore, when the wedge head 300 performs an upward linear motion, the jaw 400 can perform a linear motion in the right direction (the jaw 400 can move outward from the center of the gripper).

Further, when the rotary shaft of the motor 100 rotates in the opposite direction to the one direction, the nut of the ball screw 160 and the wedge head 300 may perform a downward linear motion. Specifically, the first catching protrusion 313 formed on the wing 310 of the wedge head 300 may be fitted in a sliding manner in the catching groove 410 of the jaw 400 and perform a downward linear motion. Here, the end of the side of the jaw 400, where the catching groove 410 of the jaw 400 has been formed, has a diagonal shape such that the upper portion of the end of the side of the jaw 400 protrudes more in the longitudinal direction of the jaw 400 than the lower portion of the end of the side of the jaw 400. Therefore, when the wedge head 300 performs a downward linear motion, the jaw 400 can perform a linear motion in the left direction (the jaw 400 can move from the outside of the gripper to the center of the gripper).

The gripper according to the embodiment of the present invention includes the finger.

Figure 8:
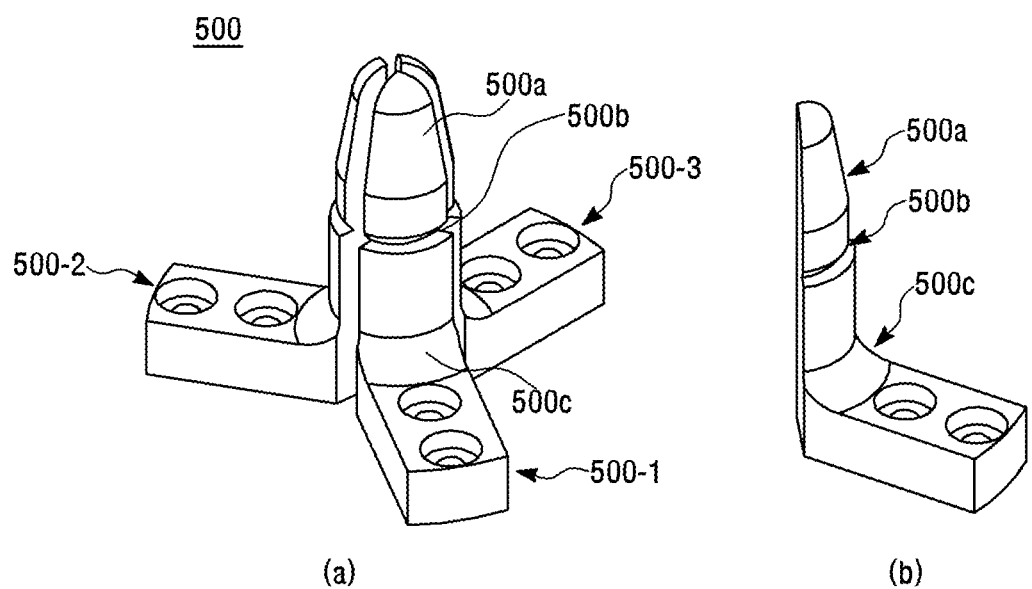
FIG. 8 shows a first embodiment of the finger which is placed in the jaw shown in FIG. 5.
Figure 9:
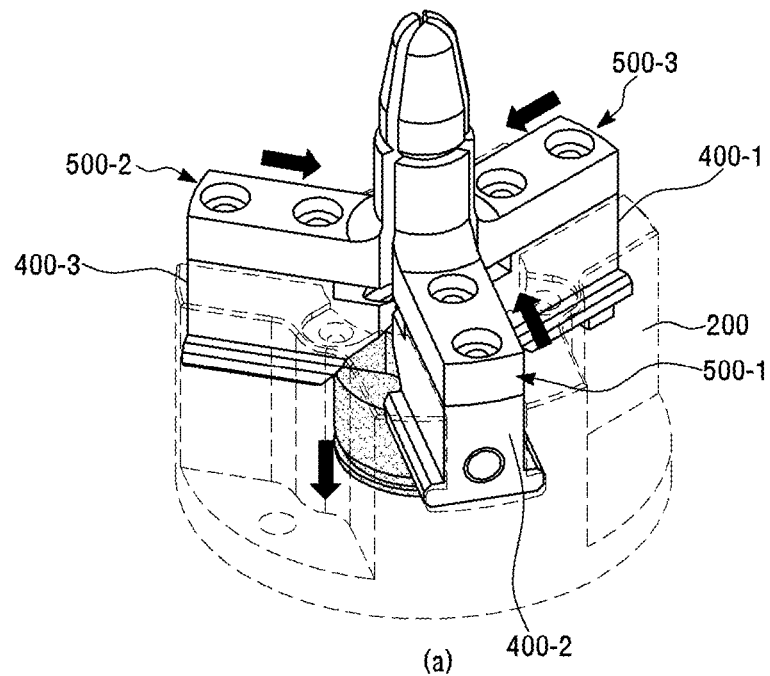
FIG. 9 shows a process in which the finger shown in FIG. 8 is placed in the jaw shown in FIGS. 6 and 7 and is moved.
Figure 9:
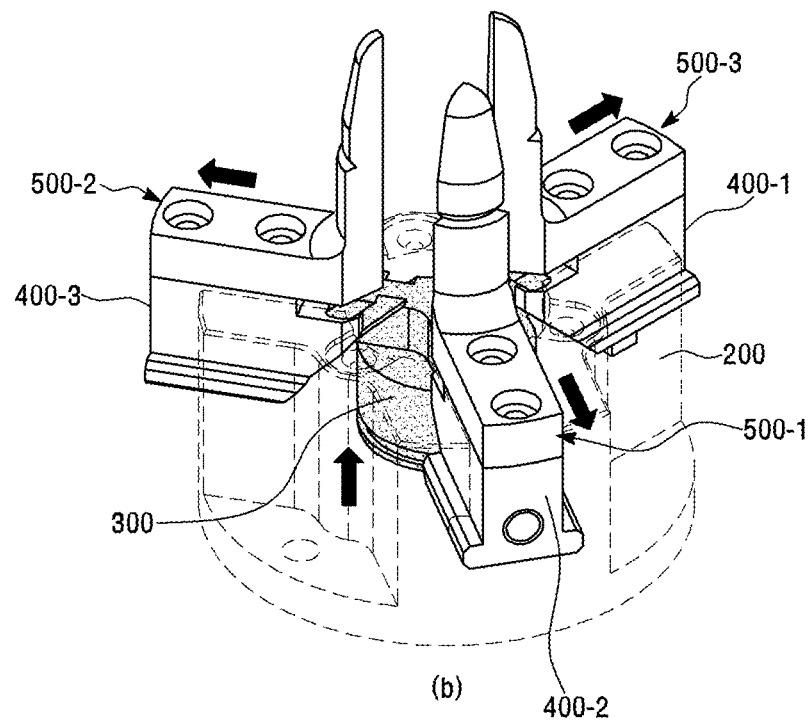
Figure 10:
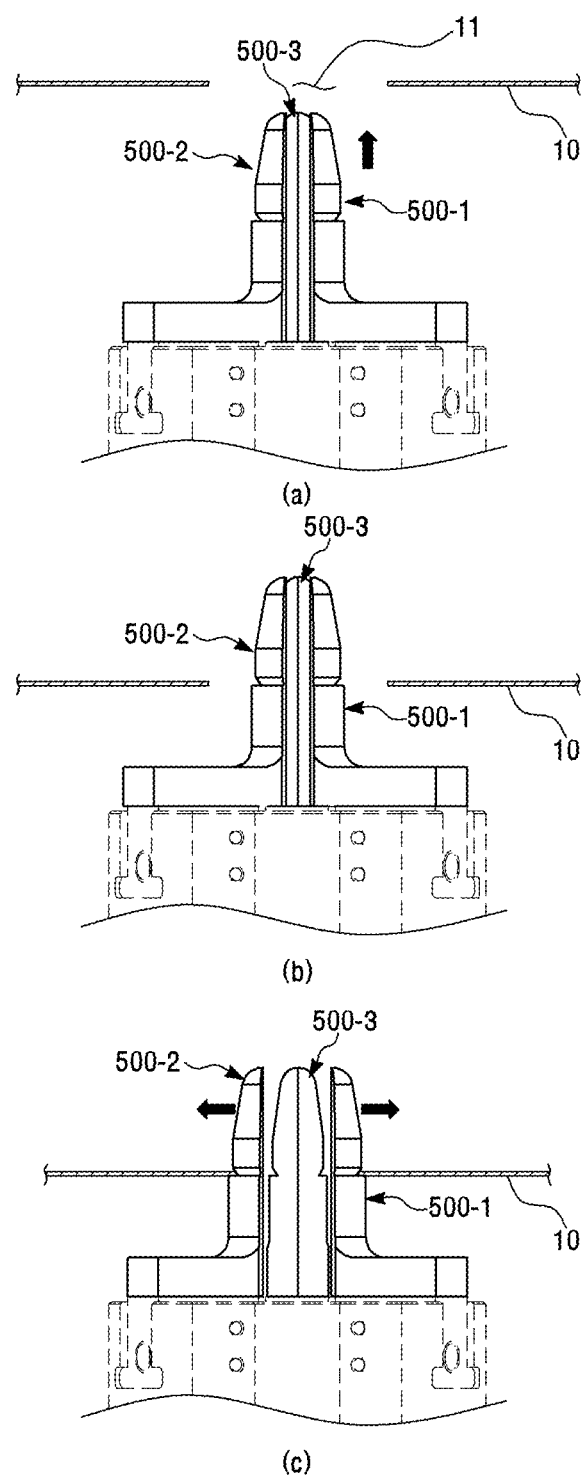
FIG. 10 shows a process in which the finger shown in FIG. 9 is inserted into a fixed portion of an object and thus the object is fixed.

FIG. 8 shows a first embodiment of the finger which is placed in the jaw shown in FIG. 5. FIG. 9 shows a process in which the finger shown in FIG. 8 is placed in the jaw shown in FIGS. 6 and 7 and is moved. FIG. 10 shows a process in which the finger shown in FIG. 9 is inserted into a fixed portion of an object and thus the object is fixed.

Referring to FIGS. 8 to 10, the finger 500 may be disposed on the jaw 400. Therefore, when the jaw 400 moves in a direction (right and left direction) perpendicular to the up and down direction, the finger 500 is also able to move in the direction (right and left direction) perpendicular to the up and down direction. When the jaw 400 moves in the direction (right and left direction) perpendicular to the up and down direction, the finger 500 moves together with the jaw 400, thereby fixing the object 10 to prevent the object 10 from moving.

The finger 500 is inserted into the fixed portion 11 of the object 10, and thus the object 10 can be fixed. Here, the object 10 refers to an object which is necessarily fixed during the working process of the production facility (e.g., a vehicle body and a vehicle panel which need to be fixed during the assembly process of a vehicle production facility). The fixed portion 11 refers to a portion formed on the object 10 when fixing the object 10 by using the gripper with the finger 500 placed (coupled). The fixed portion 11 may be a hole 11.

When the object 10 has a plurality of the fixed portions 11, the object 10 can be fixed by using two or more grippers on which the finger 500 are placed.

FIG. 9 shows three jaws 400 and the fingers 500-1, 500-2, and 500-3 are disposed on the jaws 400-1, 400-2, and 400-3 respectively. However, the finger 500 is not disposed on all the jaws 400. That is, the fingers 500 of which the number is the same as the number of the jaws 400 may be disposed on the jaws 400 of the gripper or the fingers 500 of which the number is different from the number of the jaws 400 may be disposed. For example, when there are three jaws 400 of the gripper, the fingers 500 may be disposed on the three jaws 400 respectively or may be disposed on only two of the three jaws 400. So long as the object 10 can be fixed by inserting the finger 500 into the fixed portion 11 of the object 10, none of the fingers 500 may be disposed on the jaws 400.

When there are two or three jaws 400 of the gripper, the fingers 500 which are disposed on the two or three jaws 400 may have the same shape or the shape of the jaws 400 may be varied. That is, the fingers 500 which are disposed on the plurality of jaws 400 respectively may have the same shape as or a shape corresponding to the shapes of the jaws 400. However, the fingers are not limited to this and may have different shapes.

The finger 500 may include a body 500a, a fastening portion 500b, and an extension portion 500c. The body 500a, the fastening portion 500b, and the extension portion 500c may be separately manufactured and connected to each other or may be integrally formed. Here, it means that the body 500a, the fastening portion 500b, and the extension portion 500c are separately manufactured and are not connected by welding or bonding them, but they are connected as one to each other without being physically separated.

The body 500a may be inserted into the fixed portion 11 of the object 10. That is, the body 500a of the finger 500 corresponds to a portion of the finger 500, which is inserted into the fixed portion 11 of the object 10.

The fastening portion 500b is disposed under the body 500a and is able to fix the object 10 by contact with the fixed portion 11 of the object 10. The body 500a passes through the fixed portion 11 of the object 10 and the fastening portion 500b disposed under the body 500a comes in contact with the fixed portion 11 of the object 10, so that the object 10 can be fixed.

The extension portion 500c is disposed under the fastening portion 500b. One side of the extension portion 500c may be disposed under the fastening portion 500b and the other side of the extension portion 500c may be coupled to the jaw 400.

Regarding the shape of the body 500a in the first embodiment of the finger 500 shown in FIG. 8, one end of the body 500a may be thin and the body 500a may become thicker from the one end to the other end of the body 500a in the longitudinal direction of the body 500a. Since the body 500a pass through the fixed portion 11 of the object 10, the thickest portion from one end to the other end of the body 500a in the longitudinal direction of the body 500a may be less than the cross sectional diameter of the fixed portion 11 of the object 10.

One end of the body 500a may be thin enough to be easily inserted into the fixed portion 11 of the object 10, and the one end of the body 500a may have various shapes according to the cross sectional shape of the fixed portion 11 of the object 10.

The fastening portion 500b in the first embodiment of the finger 500 shown in FIG. 8 may be formed concave along the circumference of the outer circumferential surface of the fastening portion 500b in a direction perpendicular to the longitudinal direction of the body 500a. The concave shape of the fastening portion 500b is not specially determined and the fastening portion 500b may have various shapes. An inner circumferential surface forming the fixed portion 11 of the object 10 may be disposed within the concave-shaped fastening portion 500b.

For example, the fastening portion 500b of the finger 500, which grips the object 10 such as a vehicle panel, is formed concave. Therefore, when the gripper grips the object 10, the object 10 is not separated and not tilted, and the object 10 can be gripped at a correct position of the object 10.

The extension portion 500c in the first embodiment of the finger 500 shown in FIG. 8 may be disposed under the fastening portion 500b. One side of the extension portion 500c may be connected to the fastening portion 500b, and the other side of the extension portion 500c may be coupled to the jaw 400.

The other side of the extension portion 500c and the jaw 400 may be coupled and fixed to each other by means of a fastening means such as a coupling screw, etc.

The length of the extension portion 500c is not limited to a specific length. The extension portion 500c may have a variety of lengths in accordance with the distance from the gripper to the fixed portion 11 of the object 10.

The shape of the other side of the extension portion 500c, which is coupled to the jaw 400, is not particularly limited and may have a variety of lengths in accordance with the fastening means fastening methods.

FIG. 9 shows that the finger is coupled to the jaw 400 by means of a fastening means such as a coupling screw. There are three jaws 400-1, 400-2, and 400-3 and the fingers 500-1, 500-2, and 500-3 are arranged on the jaws 400-1, 400-2, and 400-3 respectively. The movement of the finger 500 will be described as follows.

When the rotary shaft of the motor 100 rotates in one direction, the wedge head 300 may perform an upward linear motion. When the wedge head 300 performs an upward linear motion, the jaw 400 and the finger 500 coupled to the jaw 400 can perform a linear motion in the right direction (the finger 500 can move outward from the center of the gripper).

Further, when the rotary shaft of the motor 100 rotates in the opposite direction to the one direction, the wedge head 300 may perform a downward linear motion. When the wedge head 300 performs a downward linear motion, the jaw 400 and the finger 500 coupled to the jaw 400 can perform a linear motion in the left direction (the finger 500 can move from the outside of the gripper to the center of the gripper).

Describing in more detail with reference to FIG. 9, when the respective fingers 500-1, 500-2, and 500-3 move to the center and the edges of the fingers 500-1, 500-2, and 500-3 come in contact with each other, the positions of the fingers 500-1, 500-2, and 500-3 may be an origin (a central point, an initial position). Also, when the fingers 500-1, 500-2, and 500-3 are located at the origin, they come together to form a circular shape as they are viewed from the top. The more circular shape the respective fingers 500-1, 500-2, and 500-3 come together to form, the easier it is to insert the finger to a position for gripping the object. The description thereof can be applied in the same manner to other embodiments to be described below of the finger 500.

The finger 500 is coupled to the jaw 400 and performs a linear motion in a direction perpendicular to the up and down direction, so that the finger can fix the object 10.

Referring to FIG. 10, when the object 10 that needs to be fixed during the production process is disposed, the object 10 can be fixed (the movement of the object 10 can be limited) by using the gripper coupled to the end of a fixing device (not shown) in accordance with the embodiment of the present invention. This will be described in detailed as follows.

In order to insert the body 500a of the finger 500 into the fixed portion 11 of the object 10, the rotary shaft of the motor 100 rotates in the opposite direction to the one direction, and then the wedge head 300 moves downward. When the wedge head 300 moves downward, the finger 500 coupled to the jaw 400 moves from the outside of the gripper toward the longitudinal center of the gripper. Therefore, the fingers 500-1, 500-2, and 500-3 coupled to the plurality of jaws 400-1, 400-2, and 400-3 respectively move toward the longitudinal center of the gripper and gather at the center of the gripper. The maximum diameter of the entire cross section of a portion corresponding to each body 500a of the plurality of fingers 500-1, 500-2, and 500-3 which have gathered at the center of the gripper (here, the cross section refers to a cross section of the body 500a in a direction perpendicular to the longitudinal direction of the body 500a) is less than the diameter of the cross section of the fixed portion 11 formed on the object 10, so that the portion corresponding to each body 500a of the plurality of fingers 500-1, 500-2, and 500-3 which have gathered at the center of the gripper can be inserted into the fixed portion 11 of the object 10.

Here, the portion corresponding to the body 500a of the fingers 500-1, 500-2, and 500-3 of the gripper is inserted into the fixed portion 11 of the object 10. The portion can be inserted until the inner circumferential surface forming (defining) the fixed portion 11 of the object 10 is positioned at the fastening portion 500b of the fingers 500-1, 500-2, and 500-3.

Also, the rotary shaft of the motor 100 rotates in the one direction, and thus, the wedge head 300 moves upward. When the wedge head 300 moves upward, the finger 500 coupled to the jaw 400 moves outward from the longitudinal center of the gripper. Therefore, the fingers 500-1, 500-2, and 500-3 coupled to the plurality of jaws 400-1, 400-2, and 400-3 respectively are farther from the center of the gripper. The fingers 500-1, 500-2, and 500-3 coupled to the plurality of jaws 400-1, 400-2, and 400-3 respectively are farther from the center of the gripper until the outer circumferential surface of the fastening portion 500*b* of the finger 500 comes in contact with the inner circumferential surface forming (defining) the fixed portion 11 of the object 10. The outer circumferential surface of the fastening portion 500*b* comes in contact with the inner circumferential surface which forms (defines) the fixed portion, thereby fixing the object.

Since the fastening portion 500*b* of the finger 500 is formed concave along the circumference of the outer circumferential surface of the fastening portion 500*b* in a direction perpendicular to the longitudinal direction of the body 500*a*, the inside of the concave portion comes in contact with the inner circumferential surface forming (defining) the fixed portion 11 of the object 10, so that the object 10 can be more securely fixed. Also, in this state, the thickest part of the portion corresponding to each body 500*a* of the plurality of fingers 500-1, 500-2, and 500-3 which have been farther from the center of the gripper passes through the fixed portion 11 of the object 10 and is disposed inside the object 10, and thus, the object 10 and the gripper are not separated by the mutual interference, so that the object 10 can be more stably fixed.

When the object 10 has a plurality of the fixed portions 11, the cross sectional diameters of the respective fixed portions 11 may be different. Also, when there are a plurality of the objects 10 that need to be fixed, the cross sectional diameters of the fixed portions 11 may be different. When the cross sectional diameters of the respective fixed portions 11 are different and the cross sectional diameter of the fixed portion 11 for the plurality of objects 10 is different, the object 10 can be fixed by causing the finger 500 coupled to the jaw 400 in conformity with the cross sectional diameter of the fixed portion 11 of the object 10 to be farther from the center of the gripper.

Accordingly, a kind of a fixing pin (not shown) which is coupled to one end of a kind of a fixing device (not shown) in the production facility and fixes the object by being inserted into the fixed portion 11 of the object 10 need not be replaced one by one in conformity with the cross sectional diameter of the fixed portion 11 of the object 10. Also, it is not necessary to provide the fixing pin suitable for each fixed portion 11. As a result, the production cost can be reduced and production time can be reduced. Additionally, the fastening portion 500*b* of the finger 500 is formed concave. Therefore, when the gripper grips the object 10 (e.g., a vehicle panel), the object 10 is not separated and not tilted, and the object 10 can be gripped at a correct position of the object 10.

The shape of the finger 500 which is coupled to the jaw 400 of the gripper may be varied. Specifically, the shape of the body 500*a* and/or fastening portion 500*b* of the finger 500 may be varied. The object 10 can be fixed by varying the shape of the body 500*a* and/or fastening portion 500*b* of the finger 500 to suit the cross sectional diameter of the fixed portion 11 of the object 10 or other shapes of the fixed portion 11.

Figure 11:
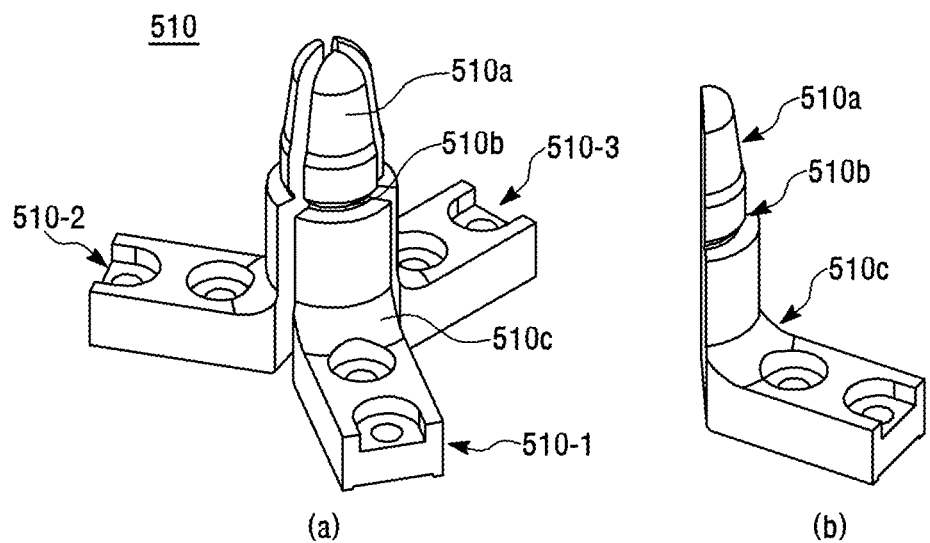
FIG. 11 shows a second embodiment of the finger.
Figure 12:
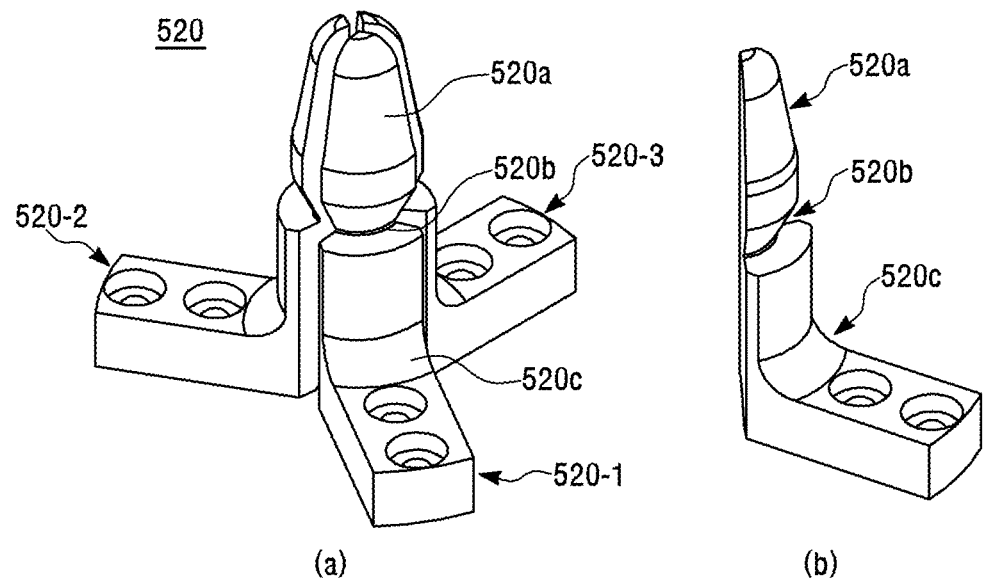
FIG. 12 shows a third embodiment of the finger.
Figure 13:
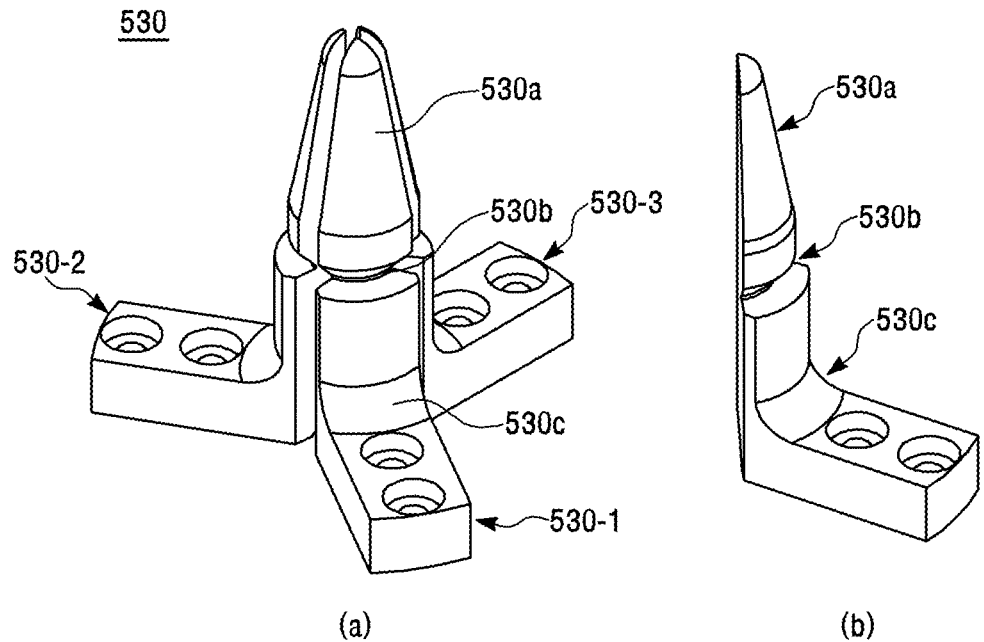
FIG. 13 shows a fourth embodiment of the finger.
Figure 14:
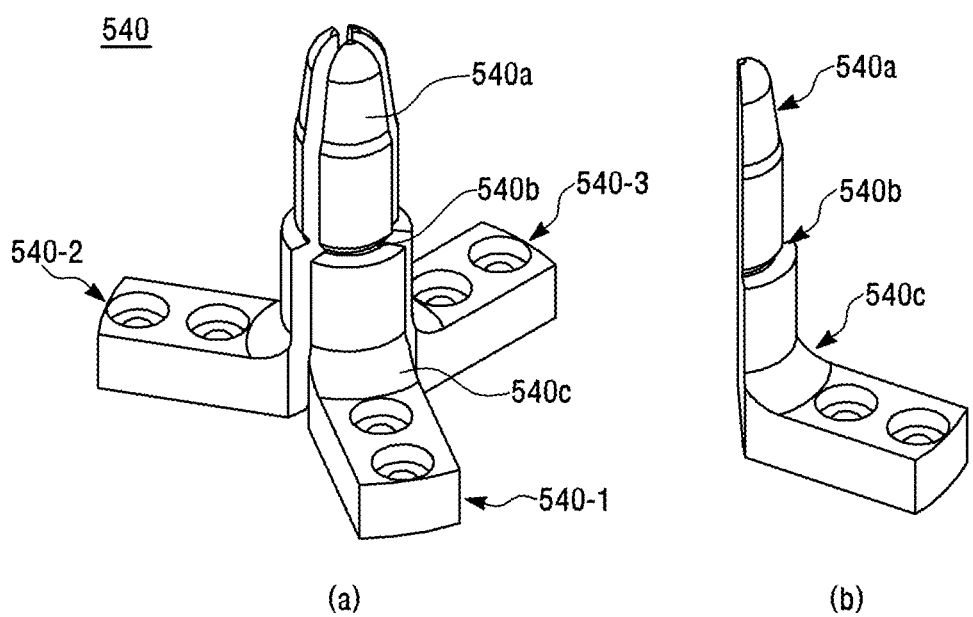
FIG. 14 shows a fifth embodiment of the finger.
Figure 15:
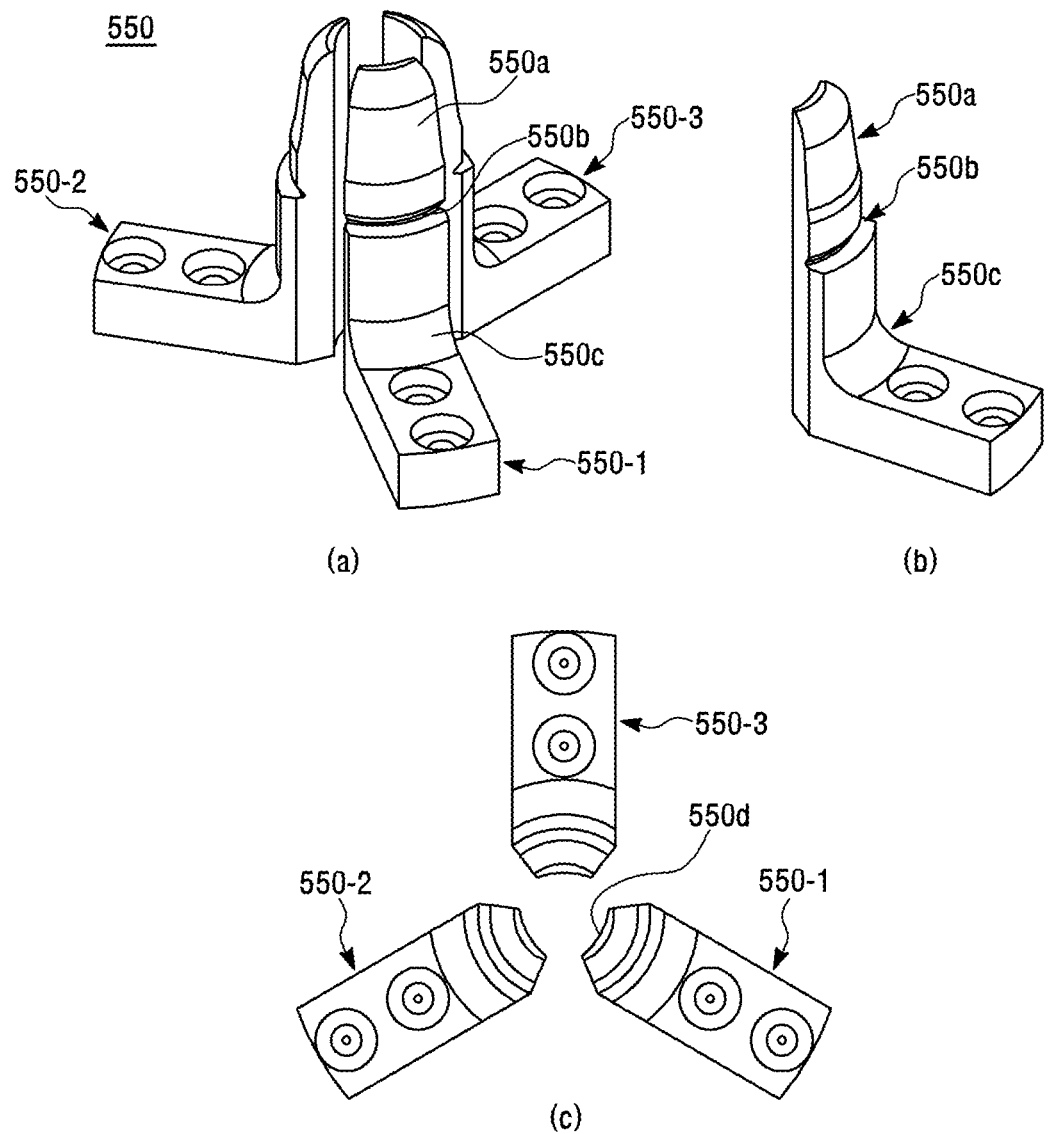
FIG. 15 shows a sixth embodiment of the finger.
Figure 16:
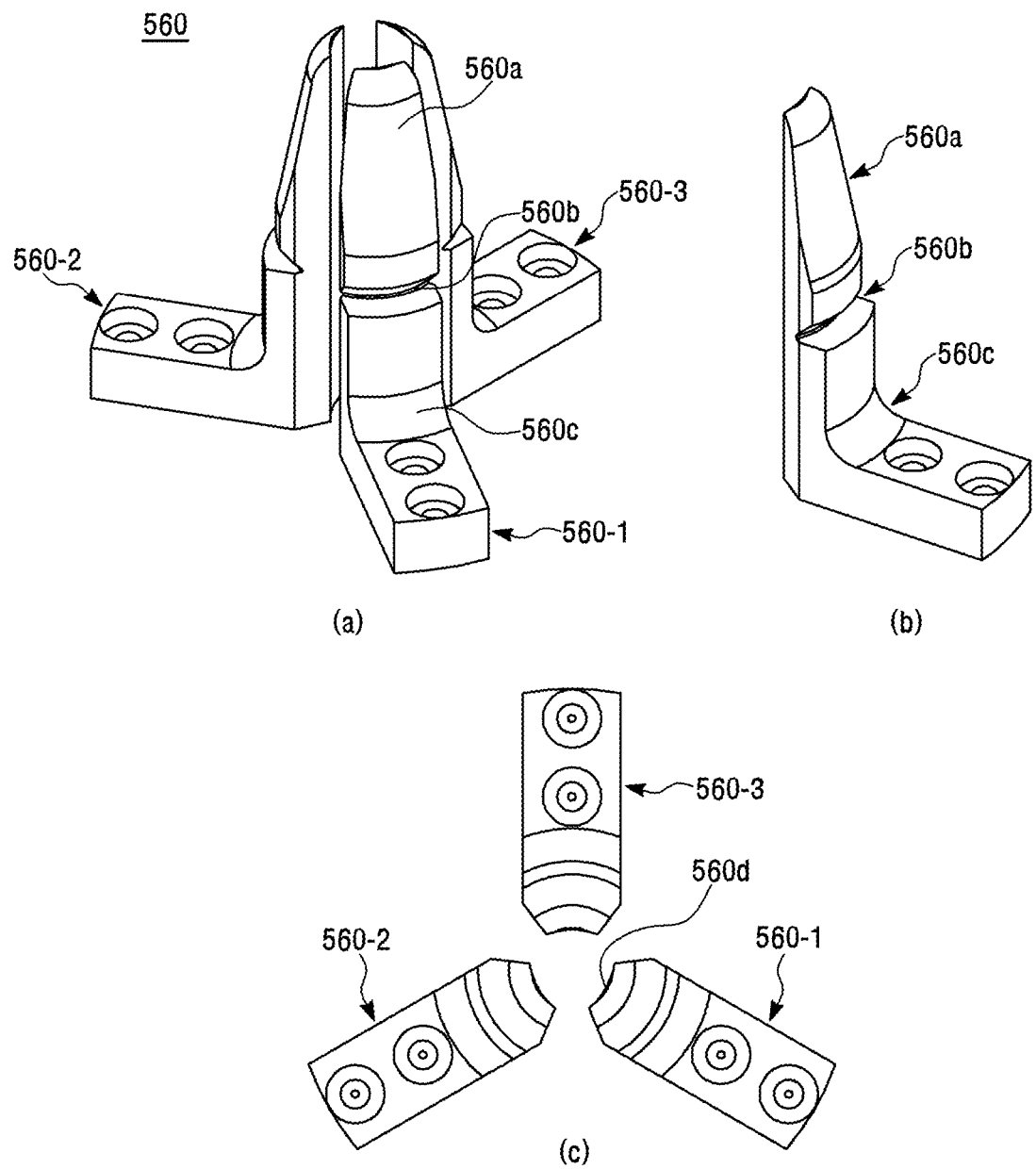
FIG. 16 shows a seventh embodiment of the finger.

FIG. 11 shows a second embodiment of the finger, FIG. 12 shows a third embodiment of the finger, FIG. 13 shows a fourth embodiment of the finger, FIG. 14 shows a fifth embodiment of the finger, FIG. 15 shows a sixth embodiment of the finger, and FIG. 16 shows a seventh embodiment of the finger.

Referring to FIGS. 11 to 16, the fingers 510, 520, 530, 540, 550, and 560 according to the second to seventh embodiments may include bodies 510*a*, 520*a*, 530*a*, 540*a*, 550*a*, and 560*a*, fastening portions 510*b*, 520*b*, 530*b*, 540*b*, 550*b*, and 560*b*, and extension portions 510*c*, 520*c*, 530*c*, 540*c*, 550*c*, and 560*c*. The bodies 510*a* to 560*a*, fastening portions 510*b* to 560*b*, and the extension portions 510*c* to 560*c* may be separately manufactured and connected to each other or may be integrally formed. Here, it means that the bodies 510*a* to 560*a*, the fastening portions 510*b* to 560*b*, and the extension portions 510*c* to 560*c* are separately manufactured and are not connected by welding or bonding them, but they are connected as one to each other without being physically separated.

The bodies 510*a* to 560*a*, the fastening portions 510*b* to 560*b*, and the extension portions 510*c* to 560*c* of the fingers 510 to 560 according to the second to seventh embodiments are similar to the body 500*a*, the fastening portion 500*b*, and the extension portion 500*c* of the finger 500 according to the first embodiment. Hereinafter, in description of the fingers 510 to 560 according to the second to seventh embodiments, configuration or part different from that of the finger 500 according to the first embodiment will be specifically described, and the configuration or part the same as or similar to that of the finger 500 according to the first embodiment will be replaced by the description of the finger 500 according to the first embodiment.

In the finger 510 according to the second embodiment, one end of the body 510*a* may be thin, and the body 510*a* may become thicker from the one end to the other end of the body 510*a* in the longitudinal direction of the body 510*a*. Also, a level difference or a groove (not shown) may be formed between the one end and the other end of the body 510*a* in the longitudinal direction of the body 510*a*.

In the finger 520 according to the third embodiment, the fastening portion 520*b* may be formed concave along the circumference of the outer circumferential surface of the fastening portion 520*b* in a direction perpendicular to the longitudinal direction of the body 520*a*. Here, an angle formed between the top and bottom surfaces forming the inner surface of the concave groove may be greater than an angle formed between the top and bottom surfaces forming the inner surface of the concave groove of the fastening portion 500*b* of the finger 500 according to the first embodiment.

The body 530*a* of the finger 530 according to the fourth embodiment may be thinner and longer than the body 510*a* of the finger 510 according to the second embodiment.

In the finger 540 according to the fifth embodiment, one end of the body 540*a* may be thin, and the body 540*a* may become thicker from the one end to the other end of the body 540*a* in the longitudinal direction of the body 540*a*. Also, a level difference may be formed between the one end and the other end of the body 540*a* in the longitudinal direction of the body 540*a*. The thickness from the level difference to the other end of the body 540*a* may be uniform.

In the finger 550 according to the sixth embodiment, the body 550*a* may include one side and the other side 550*d*.

The one side of the body 550*a* will be described as follows. One end of the one side of the body 550*a* may be thin, and the one side of the body 550*a* may become thicker from the one end to the other end of the body 550*a* in the longitudinal direction of the body 550*a*. Also/alternatively, a level difference may be formed between the one end and the other end of the body 550*a* in the longitudinal direction of the body 550*a*. The thickness from the level difference to the other end of the body 550*a* may be uniform.

The other side 550d of the body 550a may be formed concave (groove shape) from one end to the other end of the body 550a in the longitudinal direction of the body 550a.

Also, in the finger 550, the fastening portion 550b may include one side and the other side.

The one side of the fastening portion 550b will be described as follows. The one side of the fastening portion 550b may be formed concave along the circumference of the outer circumferential surface of the fastening portion 550b in a direction perpendicular to the longitudinal direction of the body 550a. The concave shape of the fastening portion 550b is not specially determined and the fastening portion 550b may have various shapes.

The other side of the fastening portion 550b may be formed to have the same shape as or a corresponding shape to the shape of the other side 550d of the body 550a. The shape of the other side 550d of the body 550a may extend to the other side of the fastening portion 550b. Also, the shape of the other side 550d of the body 550a may extend to the other side of the extension portion 550c.

In the finger 550 according to the sixth embodiment, the other sides of the body 550a, the fastening portion 550b, and/or the extension portion 550c are formed concave because they are intended to grip an object (not shown).

When the rotary shaft of the motor 100 rotates in the opposite direction to the one direction, the wedge head 300 moves downward, and the finger 550 coupled to the jaw 400 moves from the outside of the gripper toward the longitudinal center of the gripper. Here, the other sides of the body 550a, the fastening portion 550b, and/or the extension portion 550c of the fingers 550-1, 550-2, and 550-3 coupled to the plurality of jaws 400-1, 400-2, and 400-3 respectively contact (grip) the object. Therefore, the finger 550 is able to limit the movement of the object.

Describing in more detail with reference to FIG. 15, when the respective fingers 550-1, 550-2, and 550-3 move to the center and the concave portions formed on the other sides of the respective fingers 550-1, 550-2, and 550-3 come together to form a circular shape (when viewed from the top), the positions of the fingers 550-1, 550-2, and 550-3 may be an origin (a central point, an initial position). The description thereof can be applied in the same manner to the seventh embodiment to be described below of the finger 500.

In the finger 560 according to the seventh embodiment, the body 560a and/or the fastening portion 560b may include one side and the other side 560d.

In the finger 560 according to the seventh embodiment, one end of the body 560a may be thinner and longer than the one side of the body 550a of the finger 550 according to the sixth embodiment. Other shapes of the finger 560 according to the seventh embodiment may be the same as or correspond to the shapes of the finger 550 according to the sixth embodiment.

In the gripper according to the embodiment of the present invention, a jaw cover 600 may be disposed on the jaw guide 200. The jaw cover 600 may have a plate shape having a curvature or a level difference.

The features, structures and effects and the like described in the embodiments are included in at least one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although the embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:

1. A gripper comprising:
   a motor;
   a jaw guide which is disposed on the motor and has a guide hole and a plurality of guide grooves;
   a wedge head which is disposed in the guide hole and is able to perform up and down reciprocating movement by the motor;
   a jaw which is disposed in the plurality of guide grooves respectively and is connected to the wedge head, wherein, when the wedge head moves in an up and down direction, the jaw is able to perform a reciprocating movement in a direction perpendicular to the up and down direction; and
   a finger which is disposed on the jaw,
   wherein, when the jaw moves in the direction perpendicular to the up and down direction, the finger moves together with the jaw, so that the movement of an object is limited,
   wherein the finger comprises:
      a body;
      a fastening portion which is disposed under the body; and
      an extension portion which is disposed under the fastening portion, of which one end is connected to the fastening portion, and of which an other end is coupled to the jaw,
   wherein, after the body is inserted into a fixed portion of the object, when a rotary shaft of the motor rotates in one direction, the wedge head moves upward and the finger disposed on the jaw moves outward from a longitudinal center of the gripper, and then an outer circumferential surface of the fastening portion comes in contact with an inner circumferential surface forming the fixed portion of the object, so that the movement of an object is limited,
   wherein the body becomes thicker from one end thereof to an other end thereof in a longitudinal direction of the body,
   wherein an other side of the body is formed concave from one end to the other end of the body in the longitudinal direction of the body;
   wherein the fastening portion is formed concave along a circumference of the outer circumferential surface of the fastening portion in a direction perpendicular to the longitudinal direction of the body, and
   wherein an inner circumferential surface forming the fixed portion of the object is disposed within the concave-shaped fastening portion.

2. A gripper comprising:
   a motor;
   a jaw guide which is disposed on the motor and has a guide hole and a plurality of guide grooves;
   a wedge head which is disposed in the guide hole and is able to perform up and down reciprocating movement by the motor;

a jaw which is disposed in the plurality of guide grooves respectively and is connected to the wedge head, wherein, when the wedge head moves in an up and down direction, the jaw is able to perform a reciprocating movement in a direction perpendicular to the up and down direction; and a finger which is disposed on the jaw, wherein, when the jaw moves in the direction perpendicular to the up and down direction, the finger moves together with the jaw, so that the movement of an object is limited, wherein the finger comprises:

a body;

a fastening portion which is disposed under the body; and an extension portion which is disposed under the fastening portion, of which one end is connected to the fastening portion, and of which an other end is coupled to the jaw, wherein, after the body is inserted into a fixed portion of the object, when a rotary shaft of the motor rotates in one direction, the wedge head moves upward and the finger disposed on the jaw moves outward from a longitudinal center of the gripper, and then an outer circumferential surface of the fastening portion comes in contact with an inner circumferential surface forming the fixed portion of the object, so that the movement of an object is limited, wherein a level difference is formed between one end and an other end of the body in a longitudinal direction of the body, wherein the body becomes thicker from the one end to the level difference of the body, and wherein the thickness from the level difference to the other end of the body is uniform, wherein an other side of the body is formed concave from one end to the other end of the body in the longitudinal direction of the body;

wherein the fastening portion is formed concave along a circumference of the outer circumferential surface of the fastening portion in a direction perpendicular to the longitudinal direction of the body, and wherein an inner circumferential surface forming the fixed portion of the object is disposed within the concave-shaped fastening portion.

3. A gripper comprising:

a motor;

a jaw guide which is disposed on the motor and has a guide hole and a plurality of guide grooves;

a wedge head which is disposed in the guide hole and is able to perform up and down reciprocating movement by the motor;

a jaw which is disposed in the plurality of guide grooves respectively and is connected to the wedge head, wherein, when the wedge head moves in an up and down direction, the jaw is able to perform a reciprocating movement in a direction perpendicular to the up and down direction; and a finger which is disposed on the jaw, wherein the finger comprises:

a body;

a fastening portion which is disposed under the body; and an extension portion which is disposed under the fastening portion, of which one end is connected to the fastening portion, and of which an other end is coupled to the jaw, wherein, when the jaw moves in the direction perpendicular to the up and down direction, the finger moves together with the jaw, so that the movement of an object is limited, wherein one side of the body becomes thicker from one end to an other end of the body in a longitudinal direction of the body, wherein an other side of the body is formed concave from one end to the other end of the body in the longitudinal direction of the body, and wherein when a rotary shaft of the motor rotates in the opposite direction to one direction, the wedge head moves downward and the finger disposed on the jaw moves from an outside of the gripper toward a longitudinal center of the gripper, and then the other side of the body contacts the object, so that the movement of the object is limited.

4. The gripper of claim 3, wherein one side of the fastening portion is formed concave along a circumference of an outer circumferential surface of the fastening portion in a direction perpendicular to the longitudinal direction of the body, wherein the other side of the fastening portion is the same as the other side of the body, and wherein the other side of the body and the other side of the fastening portion contact the object, so that the movement of the object is limited.

\* \* \* \* \*